(12) United States Patent
Jarman et al.

(10) Patent No.: US 11,352,795 B2
(45) Date of Patent: Jun. 7, 2022

(54) DRAINAGE SYSTEM

(71) Applicant: Hydro International Ltd, Clevedon (GB)

(72) Inventors: Daniel Stuart Jarman, Somerset (GB); Jeremy Paul Lecornu, Somerset (GB)

(73) Assignee: Hydro International Ltd, Clevedon (GB)

( * ) Notice: Subject to any disclaimer, the term of this patent is extended or adjusted under 35 U.S.C. 154(b) by 192 days.

(21) Appl. No.: 16/792,371

(22) Filed: Feb. 17, 2020

(65) Prior Publication Data

US 2020/0263433 A1 Aug. 20, 2020

(30) Foreign Application Priority Data

Feb. 19, 2019 (GB) .................................... 1902259.9

(51) Int. Cl.
| | |
|---|---|
| *F15D 1/00* | (2006.01) |
| *E04D 13/08* | (2006.01) |
| *E03B 1/04* | (2006.01) |
| *E03B 3/02* | (2006.01) |
| *E03B 7/08* | (2006.01) |

(52) U.S. Cl.
CPC .............. *E04D 13/08* (2013.01); *E03B 1/041* (2013.01); *E03B 3/02* (2013.01); *E03B 7/08* (2013.01); *F15D 1/0015* (2013.01); *E03B 2001/047* (2013.01); *Y10T 137/2109* (2015.04)

(58) Field of Classification Search
CPC ........ E04D 13/08; E03F 5/106; F15D 1/0015; Y10T 137/2109
See application file for complete search history.

(56) References Cited

U.S. PATENT DOCUMENTS

| 2,800,925 A | 7/1957 | Tollefsen |
| 3,324,891 A * | 6/1967 | Rhoades .................. F15C 1/16 137/812 |

(Continued)

FOREIGN PATENT DOCUMENTS

| CN | 103061402 A | 4/2013 |
| CN | 208486293 U | 2/2019 |
| GB | 2525257 A | 10/2015 |

OTHER PUBLICATIONS

U.K. Combined Search and Examination Report for Application GB1902259.9 dated Jul. 22, 2019.

(Continued)

*Primary Examiner* — Kevin F Murphy
(74) *Attorney, Agent, or Firm* — Honigman LLP (57) ABSTRACT

There is described a drainage system comprising: an inlet pipe; and an energy dissipater comprising a dissipation chamber. The dissipation chamber has a dissipater inlet fluidically connected to the inlet pipe and a dissipater outlet arranged to discharge fluid from the dissipation chamber. The dissipater inlet extends between a first end and a second end. A wall of the inlet pipe extends tangentially from the dissipation chamber so as to define the first end and such that, in use, fluid is discharged into the dissipation chamber in a tangential direction, thereby inducing a circulating flow within the dissipation chamber about an axis of the dissipation chamber. The width of the dissipater inlet in a direction parallel to the axis decreases from the first end to the second end.

17 Claims, 12 Drawing Sheets

(56) References Cited

U.S. PATENT DOCUMENTS

| | | | | |
|---|---|---|---|---|
| 3,692,055 A * | 9/1972 | Benner, Jr | ............... | B01J 4/001 137/896 |
| 4,126,156 A * | 11/1978 | Barnes | ...................... | F15C 1/16 137/810 |
| 5,080,137 A * | 1/1992 | Adams | .................... | E03F 5/106 137/315.01 |
| 7,066,207 B2 * | 6/2006 | Lane | ....................... | B65G 53/08 137/806 |
| 2007/0028977 A1 * | 2/2007 | Goulet | .................. | F15D 1/0015 137/809 |

OTHER PUBLICATIONS

First Office Action, Chinese Patent Application No. 202010100285.1, dated Dec. 17, 2020.

* cited by examiner

DRAINAGE SYSTEM

CROSS REFERENCE TO RELATED APPLICATIONS

This U.S. patent application claims priority to United Kingdom Patent Application No. 1902259.9, filed on Feb. 19, 2019, the disclosure of which is considered part of the disclosure of this application and is hereby incorporated by reference in its entirety.

FIELD

The invention relates to a drainage system, such as a drainage system in a rainwater or wastewater sewer.

BACKGROUND

Drainage systems for draining fluids such as rainwater or wastewater from an area are well known. Typically, a small, shallow pipe network is provided for collecting rain from a building or the ground. A deeper recovering network is connected to the shallow pipe network via a downpipe which extends downwardly from the shallow pipe network. An energy dissipater may be provided at the end of the downpipe in order to dissipate the kinetic energy of the flow exiting from the downpipe. The flow accelerates upon exiting the downpipe and entering the energy dissipater. Such acceleration may result in cavitation, which can damage the downpipe and the energy dissipater.

SUMMARY

According to an aspect of the invention there is provided a drainage system comprising: an inlet pipe; and an energy dissipater comprising a dissipation chamber. The dissipation chamber has a dissipater inlet fluidically connected to the inlet pipe and a dissipater outlet arranged to discharge fluid from the dissipation chamber. The dissipater inlet extends between a first end and a second end. A wall of the inlet pipe extends tangentially from the dissipation chamber at the first end such that, in use, fluid is discharged into the dissipation chamber in a tangential direction, thereby inducing a circulating flow within the dissipation chamber about an axis of the dissipation chamber. The width of the dissipater inlet in a direction parallel to the axis decreases from the first end to the second end.

The width of the dissipater inlet in a direction parallel to the axis may not increase from the first end to the second end.

The dissipater inlet may have a centroid that is closer to the first end than to the second end.

The first end and the second end may be disposed on a single side of the axis.

The dissipation chamber may be substantially cylindrical.

The first end of the dissipater inlet may be formed by an edge extending parallel to the axis.

The second end of the dissipater inlet may be formed by an edge extending parallel to the axis.

The edge forming the first end may be longer than the edge forming the second end.

The dissipater inlet may be substantially trapezoidal.

The dissipater inlet may be substantially triangular.

The dissipater inlet may be substantially semi-circular.

The inlet pipe may comprise an inlet for receiving fluid and an outlet for discharging fluid into the dissipation chamber.

The cross-sectional area of the inlet pipe from the inlet of the inlet pipe to the outlet of the inlet pipe may be substantially constant.

The inlet of the inlet pipe may be circular or rectangular.

The inlet pipe may be smoothly graduated from the inlet of the inlet pipe to the outlet of the inlet pipe.

A wall of the inlet pipe may extend at an angle from the dissipation chamber at the second end.

The dissipation chamber may comprise a tube having an open end defining the dissipater outlet.

Both ends of the tube may be open. Each open end may define the dissipater outlet.

DRAWINGS

For a better understanding of the present invention, and to show more clearly how it may be carried into effect, reference will now be made, by way of example, to the accompanying drawings, of which.

DETAILED DESCRIPTION

Figure 1:
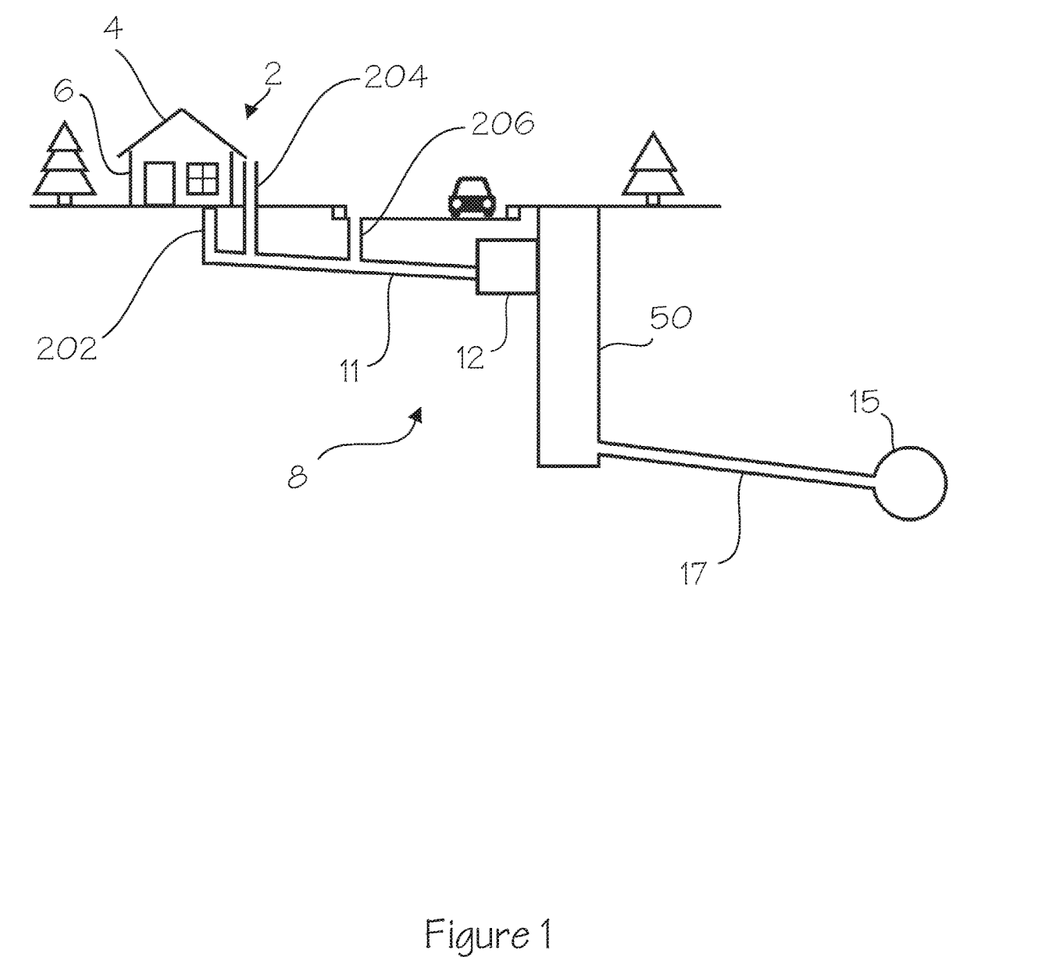
FIG. 1 is a schematic representation of a sewer network comprising a known drainage system.

FIG. 1 shows a building 2, such as a house, comprising a roof 4 and sidewalls 6. The building 2 is provided with a sewer network or drainage system 8. The drainage system 8 comprises an interior drainage pipe 202 leading from an interior of the building 2, an overground downpipe 204 leading from a gutter of the roof 4, an underground drainage pipe 206 leading from an exterior of the building 2, a conveyance pipe 11, an inlet chamber 12, an outlet chamber 50, a sewer main 15 and a horizontal conduit 17. The interior drainage pipe 202, the overground downpipe 204 and the underground drainage pipe 206 are fluidically connected to the conveyance pipe 11, which is angled in a downward direction towards the inlet chamber 12 and is fluidically connected to the inlet chamber 12. The inlet chamber 12 therefore acts as a collector. A lower end of the outlet chamber 50 is fluidically connected to the sewer main 15 via the horizontal conduit 17. For clarity, a number of features of the drainage system 8 are either shown in simplified form in FIG. 1 or not shown in FIG. 1, and are instead shown in and described with reference to the following figures.

Figure 2:
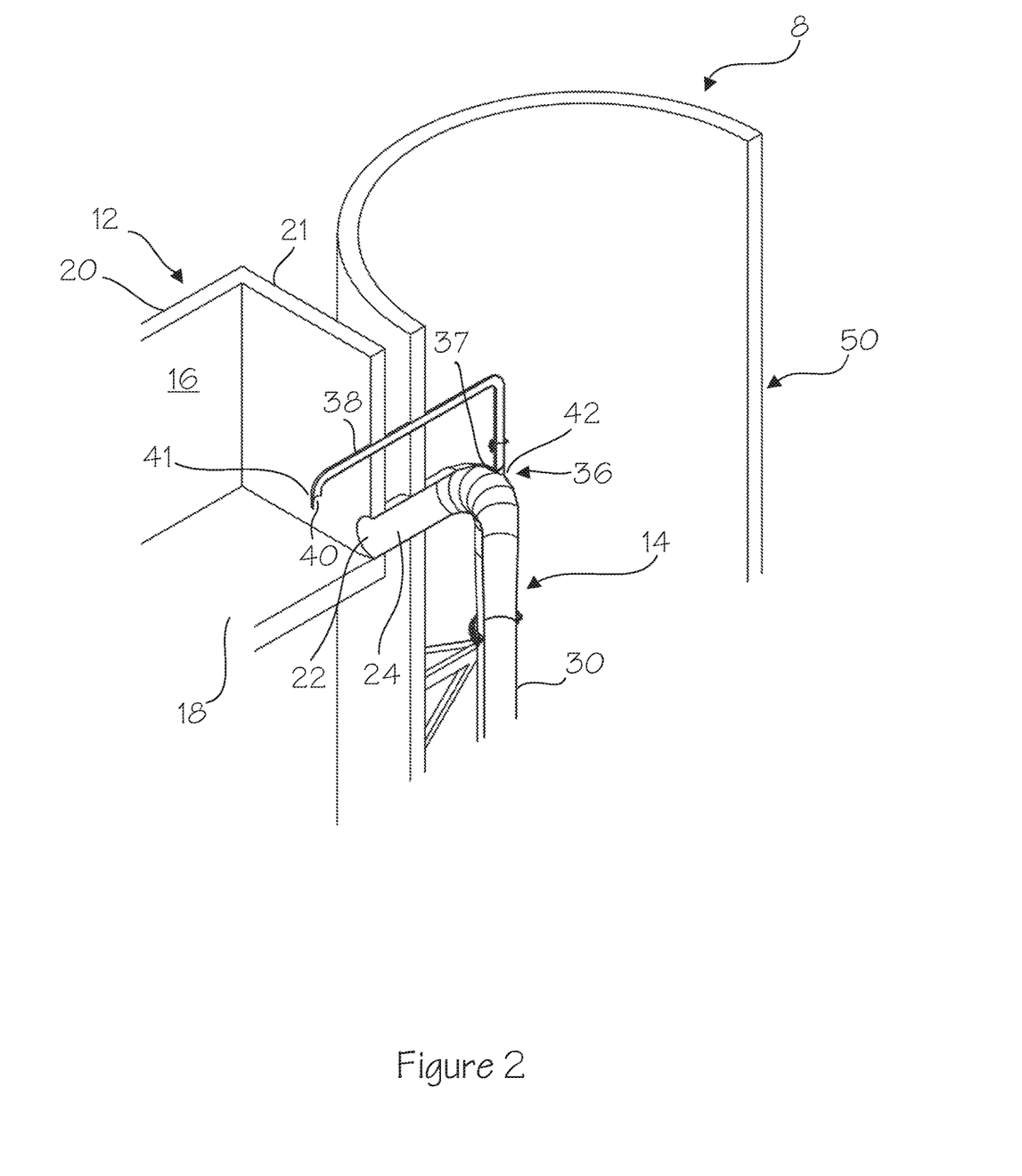
FIG. 2 is a cross-sectional perspective view of an upper portion of the known drainage system.
Figure 3:
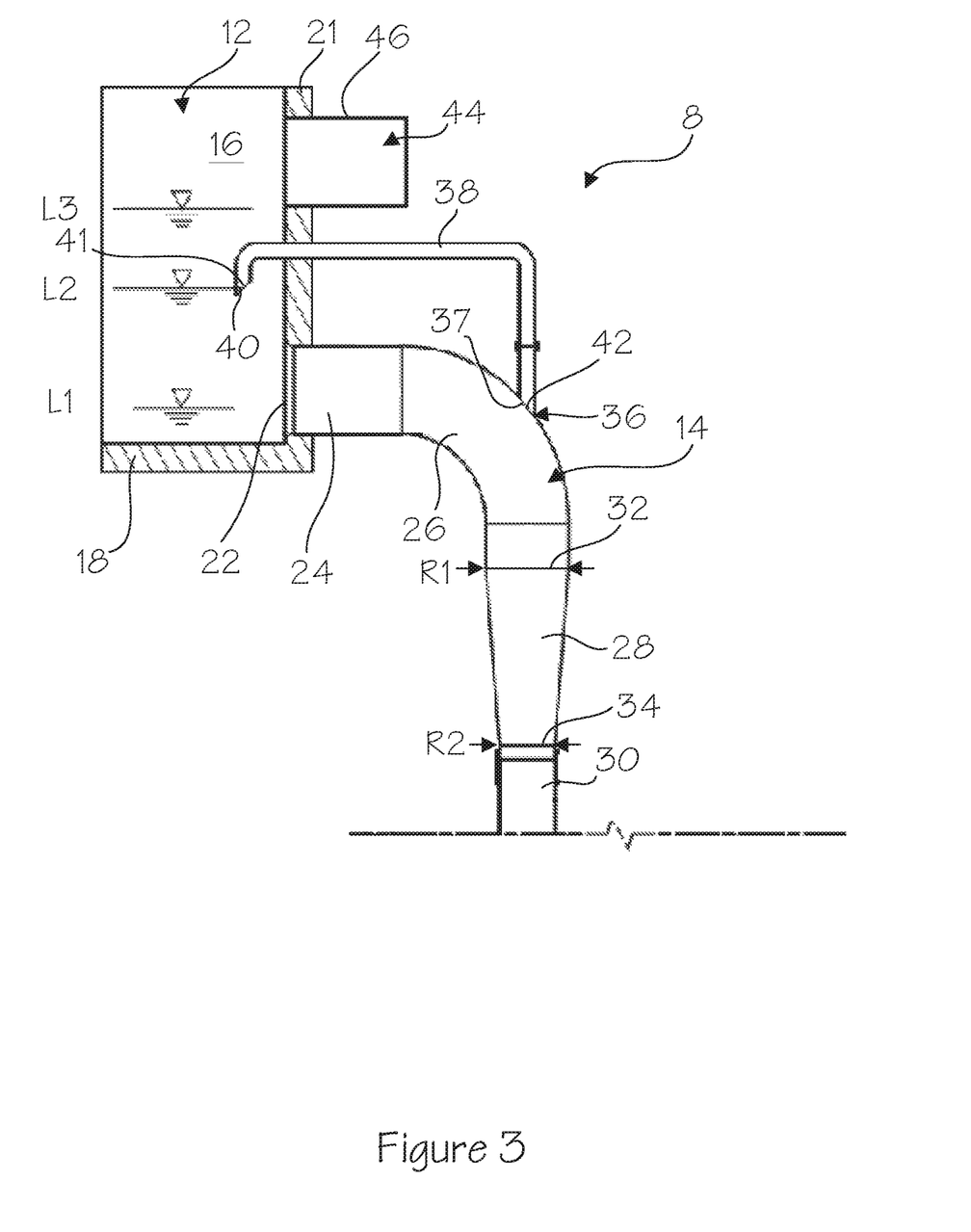
FIG. 3 is a cross-sectional side view of the upper portion of the known drainage system shown in FIG. 2.

As shown in FIGS. 2 and 3, the inlet chamber 12 comprises a channel 16 defined by a lower wall 18, an outer sidewall 20, an inner sidewall (not shown) and an end wall 21. A downpipe 14 (not shown in FIG. 1) comprising a pipe inlet 22 opens into the channel 16 through the end wall 21. The pipe inlet 22 therefore defines a channel outlet.

The downpipe 14 comprises an exit section 24, bend section 26, tapered section 28 and lower section 30. The exit section 24 extends away from the pipe inlet 22 in a horizontal direction and joins the bend section 26. The bend section 26 extends away from the exit section 24 and turns downwardly from the exit section 24 through approximately 90 degrees to join the tapered section 28. The tapered section 28 extends vertically downwardly from the bend section 26 to the lower section 30. The tapered section 28 tapers in the downward direction. The lower section 30 extends vertically downwardly from the bottom of the tapered section 28. The lower section 30 has a circular cross-sectional profile.

The exit section 24 and the bend section 26 have an internal diameter R1 which is larger than the internal diameter R2 of the lower section 30.

The tapered section 28 has an inlet portion 32 adjacent the bend section 26, which has an internal diameter that corresponds to the internal diameter of the bend section 26, and an outlet portion 34 adjacent the lower section 30, which has an internal diameter that corresponds to the internal diameter of the lower section 30. The tapered section 28 provides a constricting flow passage between the bend section 26 and the lower section 30.

The bend section 26 is provided with a vent 36 which is spaced away from the pipe inlet 22. The vent 36 comprises an aperture 37 through the wall of the bend section 26. The aperture 37 is located at a radially outer portion of the bend section 26 relative to the radius of curvature of the bend section 26. In the embodiment shown, the aperture 37 is level with the axial center of the pipe inlet 22 and the exit section 24. However, it will be appreciated that the aperture 37 may be offset from the axial center of the pipe inlet 22 and the exit section 24.

A vent duct 38, in the form of a tube, extends away from the vent 36. The vent duct 38 has a vent inlet 40 and a vent outlet 42. The vent outlet 42 is arranged such that the vent outlet 42 opens through the aperture 37 into an upper region of the bend section 26.

The vent duct 38 extends vertically upwardly from the vent outlet 42 before turning thorough 90 degrees towards the inlet chamber 12. The vent duct 38 extends through the end wall 21 into the channel 16 and turns downwardly through 90 degrees to the vent inlet 40. The vent inlet 40 comprises an aperture 41 at the end of the vent duct 38 which extends in a plane which is inclined at approximately 45 degrees to the horizontal. It will be appreciated that the plane in which the aperture 41 extends may be inclined at an angle between 0 and not more than 90 degrees. However, an angle of not less than 20 and not more than 70 degrees is preferred, for example an angle between 40 and 50 degrees. The vent inlet 40 is disposed above the top of the pipe inlet 22.

The vent 36 and vent duct 38 provide fluid communication between the downpipe 14 and the region of the channel 16 above the pipe inlet 22.

The inlet chamber 12 is provided with an overflow 44 (not shown in FIG. 2) disposed above the vent inlet 40. The overflow 44 comprises a tube 46 which extends horizontally from the channel 16 through the end wall 21.

Figure 4:
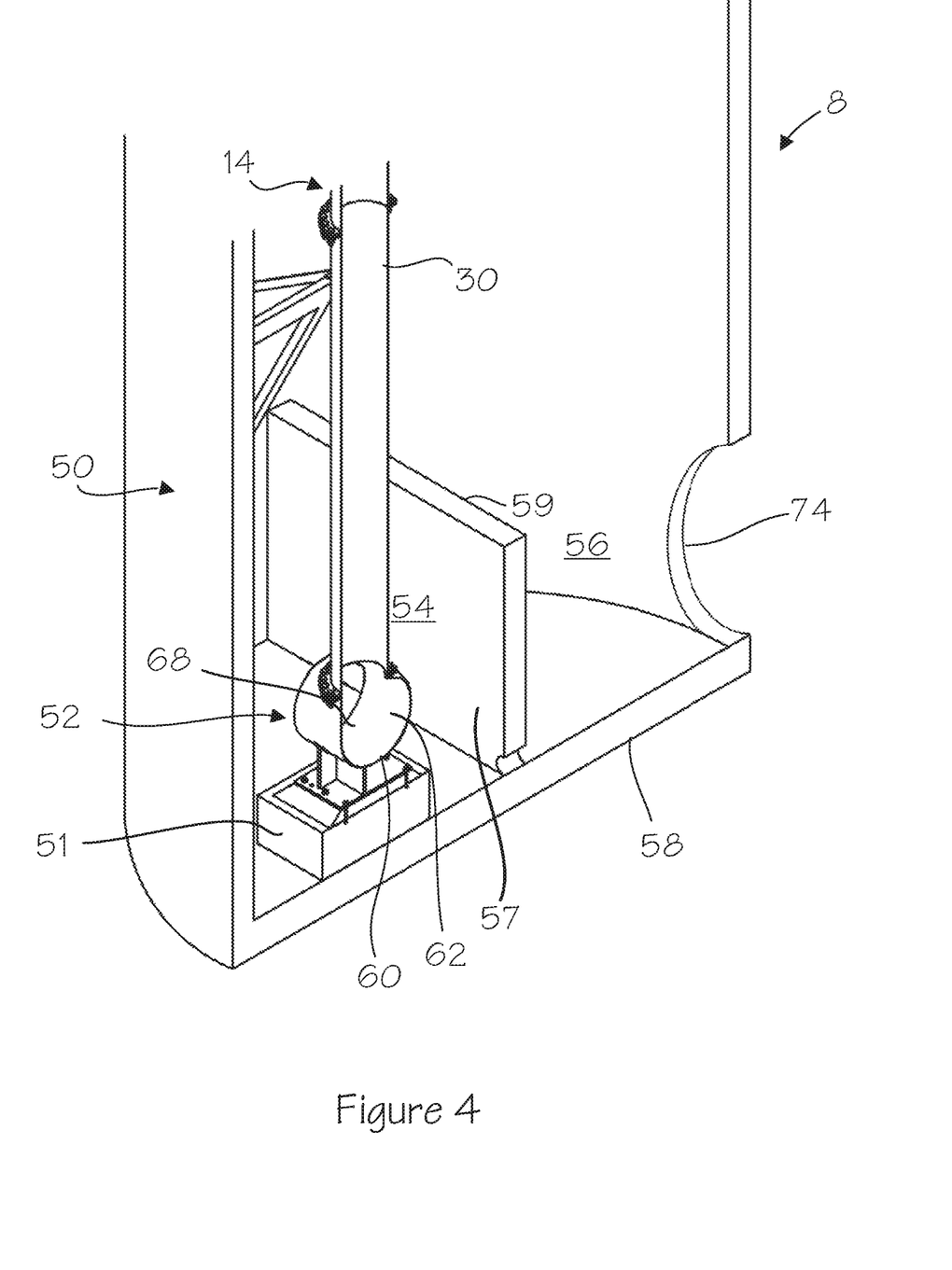
FIG. 4 is a cross-sectional perspective view of a lower portion of the known drainage system.
Figure 5:
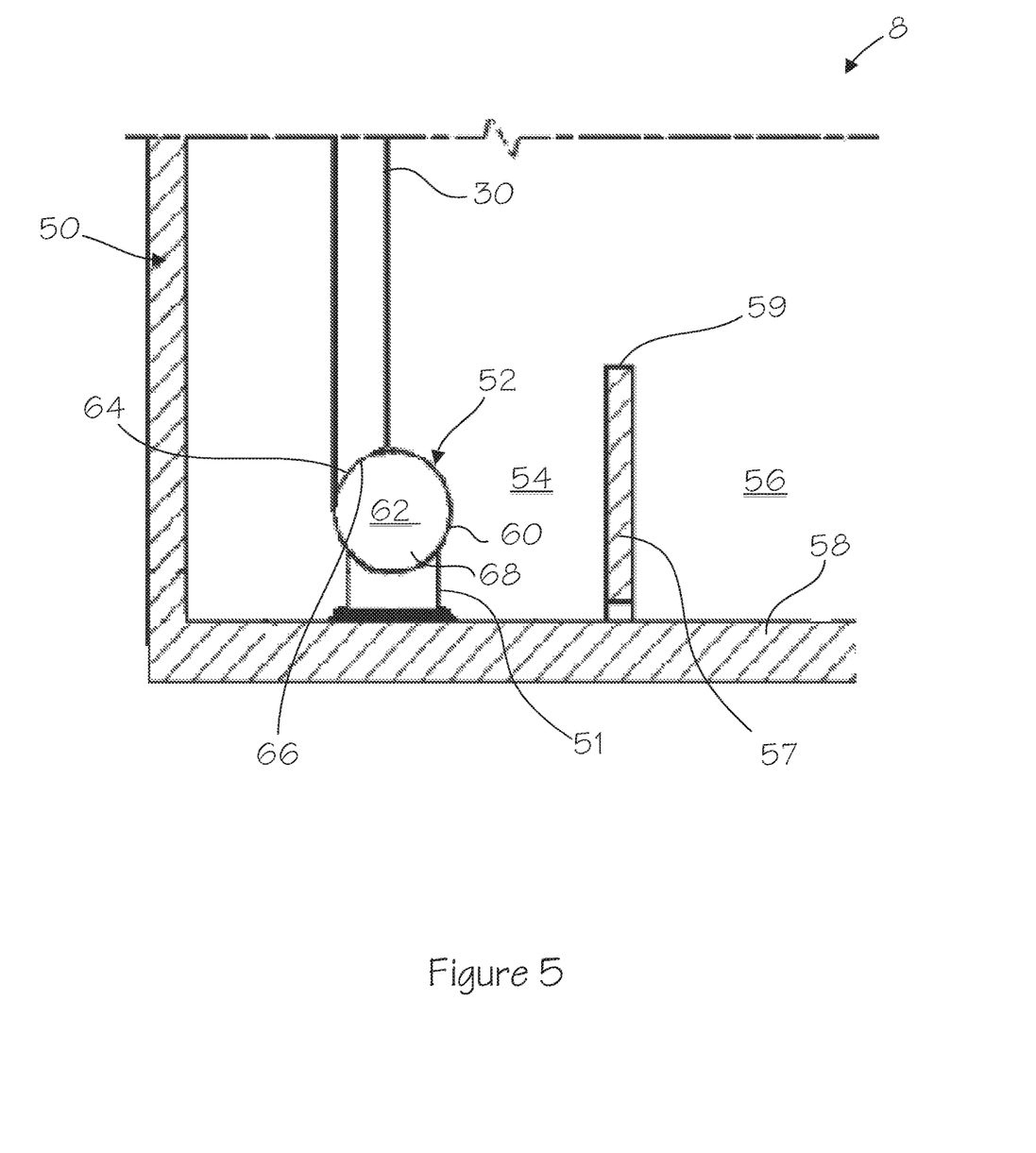
FIG. 5 is a cross-sectional side view of the lower portion of the known drainage system shown in FIG. 4.

FIGS. 4 and 5 show a lower portion of the drainage system 8. The lower portion of the drainage system 8 comprises the lower section 30 of the downpipe 14, an outlet chamber 50 and an energy dissipater 52 (not shown in FIG. 1).

The outlet chamber 50 comprises a collection chamber 54 and a drainage chamber 56. The collection chamber 54 and the drainage chamber 56 are separated by a baffle 57 which extends upwardly from a base 58 of the outlet chamber 50. The top of the baffle 57 provides a weir 59 between the collection chamber 54 and the drainage chamber 56. The energy dissipater 52 is disposed within the collection chamber 54.

The energy dissipater 52 comprises an open ended tube 60 which defines a substantially cylindrical dissipation chamber 62. A substantially cylindrical chamber 62 may have curved or planar wall sections provided that the chamber 62 is capable of sustaining rotational flow within the chamber 62. The tube 60 is arranged such that it extends horizontally within the collection chamber 54.

The tube 60 is fixed to the bottom of the lower section 30 of the downpipe 14 such that the energy dissipater 52 is in fluid communication with the downpipe 14. The energy dissipater 52 may be supported by the downpipe 14 and/or by the base 58 of the collection chamber 54 via a support 51, for example.

As shown in FIG. 4, the drainage chamber 56 is provided with a drain outlet 74. The drain outlet 74 provides an outlet from the outlet chamber 50 and is fluidically connected to the horizontal conduit 17 (not shown in FIG. 4).

As shown in FIG. 5, the downpipe 14 comprises a downpipe outlet 64 at the bottom of the lower section 30. The lower section 30 of the downpipe 14 has a circular cross-sectional profile along its length. The downpipe outlet 64 is substantially circular.

The dissipation chamber 62 comprises a dissipater inlet 66 provided in the wall of the tube 60. The inlet 66 is located approximately midway along the length of the tube 60. The inlet 66 is arranged in fluid communication with downpipe outlet 64. The profile of the inlet 66 substantially corresponds to the profile of the downpipe outlet 64. Accordingly, the inlet 66 is substantially circular. The energy dissipater 52 is arranged with respect to the lower section 30 such that the longitudinal axis of the lower section 30 is perpendicular to, and offset from, the longitudinal axis of the tube 60.

The open ends of the tube 60 provide respective dissipater outlets 68 from the dissipation chamber 62. The outlets 68 open into the collection chamber 54.

In use, rainwater or wastewater (i.e. a liquid) passes from the interior drainage pipe 202, overground downpipe 204 and underground drainage pipe 206 into the conveyance pipe 11. The rainwater or wastewater passes along the conveyance pipe 11 and into the channel 16 of the inlet chamber 12. Water which collects in the channel 16 flows along the channel 16 and drains through the pipe inlet 22 of the downpipe 14. The water flows from the pipe inlet 22 through the exit section 24, bend section 26, tapered section 28 and down the lower section 30. The water flows out of the downpipe outlet 64, through the dissipater inlet 66 and into the dissipation chamber 62 of the energy dissipater 52. During normal use the collection chamber 54, within which the energy dissipater 52 is disposed, is flooded so as to submerge the dissipater 52. The collection chamber 54 may be flooded prior to use, or may be flooded by the initial flow of water collected by the drainage system 8 into the collection chamber 54.

The height of the downpipe inlet 22 above the energy dissipater 52, coupled with the substantially vertical drop through the lower section 30 of the downpipe 14 means that water exiting the downpipe outlet 64 has a significant amount of kinetic energy, and exits the downpipe outlet 64 at a high velocity.

The tangential arrangement of the lower section 30 of the downpipe 14 and the dissipater inlet 66 with respect to the dissipation chamber 62 generates rotational flow of water within the chamber 62. The rotational flow dissipates the kinetic energy of the flow within the dissipation chamber 62 and reduces the rotational velocity of the water. In addition, the rotational flow within the chamber 62 produces a vortex within the chamber 62. The vortex throttles flow through the downpipe outlet 64 so that the energy dissipater provides a hydraulic brake which acts on water flowing through the downpipe 14.

As the water flows rotationally within the dissipation chamber 62 it also flows in the axial direction away from the dissipater inlet 66 towards each of the outlets 68. The rotational flow, and hence kinetic energy, of the water within the dissipation chamber decreases towards the outlets 68 such that water exits the dissipation chamber 62 into the collection chamber 54 with substantially less kinetic energy than it had when exiting the downpipe 14. The amount of disturbance within the collection chamber 54 is therefore substantially less than it would be if the downpipe outlet 64 opened directly into the collection chamber 54.

Water accumulates within the collection chamber 54 up to the level of the weir 59, before flowing over the weir 59 into the drainage chamber 56. Water that flows into the drainage chamber 56 drains through the drain outlet 74.

During conditions in which there is a low rate of flow of water into the channel 16, for example when there is light rainfall, the level of water within the channel 16 remains below the top of the pipe inlet 22. This is indicated, by way of example, by level L1 in FIG. 3.

As the flow rate into the channel 16 increases, for example as a consequence of heavy or prolonged rainfall, the level of water within the channel 16 rises above the level of the vent 36. Water flowing across the vent 36 draws air through the vent 36 into the flow. The air is entrained within the downward flow through the bend section 26. The water and air are funneled downwardly by the tapered section 28 into the lower section 30 of the downpipe 14. The tapered section 28 provides a transition between the larger diameter bend section 26 and the smaller diameter lower section 30. The water and air drain through the dissipater 52 into the collection chamber 54 as described above.

As the level of water within the channel rises further above the top of the pipe inlet 22, air continues to be drawn through the vent 36 into the downpipe 14. When the pipe inlet 22 is occluded, the amount of air drawn into the downpipe 14 is only that which is drawn through the vent.

As the level of water rises above the vent inlet 40, indicated by level L2 in FIG. 4, the water progressively occludes the inclined aperture 41. The amount of air drawn into the downpipe 14 through the vent 36 is therefore reduced by the gradual occlusion of the vent inlet 40. This creates a self-levelling adjustment to match the incoming flow rate. Once the level of the water within the channel 16 has risen above the vent inlet 40, indicated by level L3 in FIG. 4, no air is drawn into the downpipe 14. The drainage system 8 is then in a full liquid flow mode.

The progressive reduction of the amount of air which is drawn into the downpipe 14, by limiting the amount of air drawn into the downpipe 14 to that which is drawn through the vent 36 from the vent inlet 40, provides a generally smooth transition from an air-entrained mode to the full liquid flow mode.

A further rise in the level of water within the channel 16 to the level of the overflow 44, for example during extreme rainfall, causes water to flow out of the channel 16 through the tube 46 of the overflow 44.

It will be appreciated that in alternative embodiments the vent duct need not be in direct fluid communication with channel, for example the vent duct may extend vertically upward to a vent inlet directly above the downpipe.

It will be appreciated that the pipe inlet may be arranged such that it opens through the lower wall (i.e. floor) of the channel. In such an embodiment, the downpipe may be arranged to extend vertically downwardly from the channel.

Figure 9:
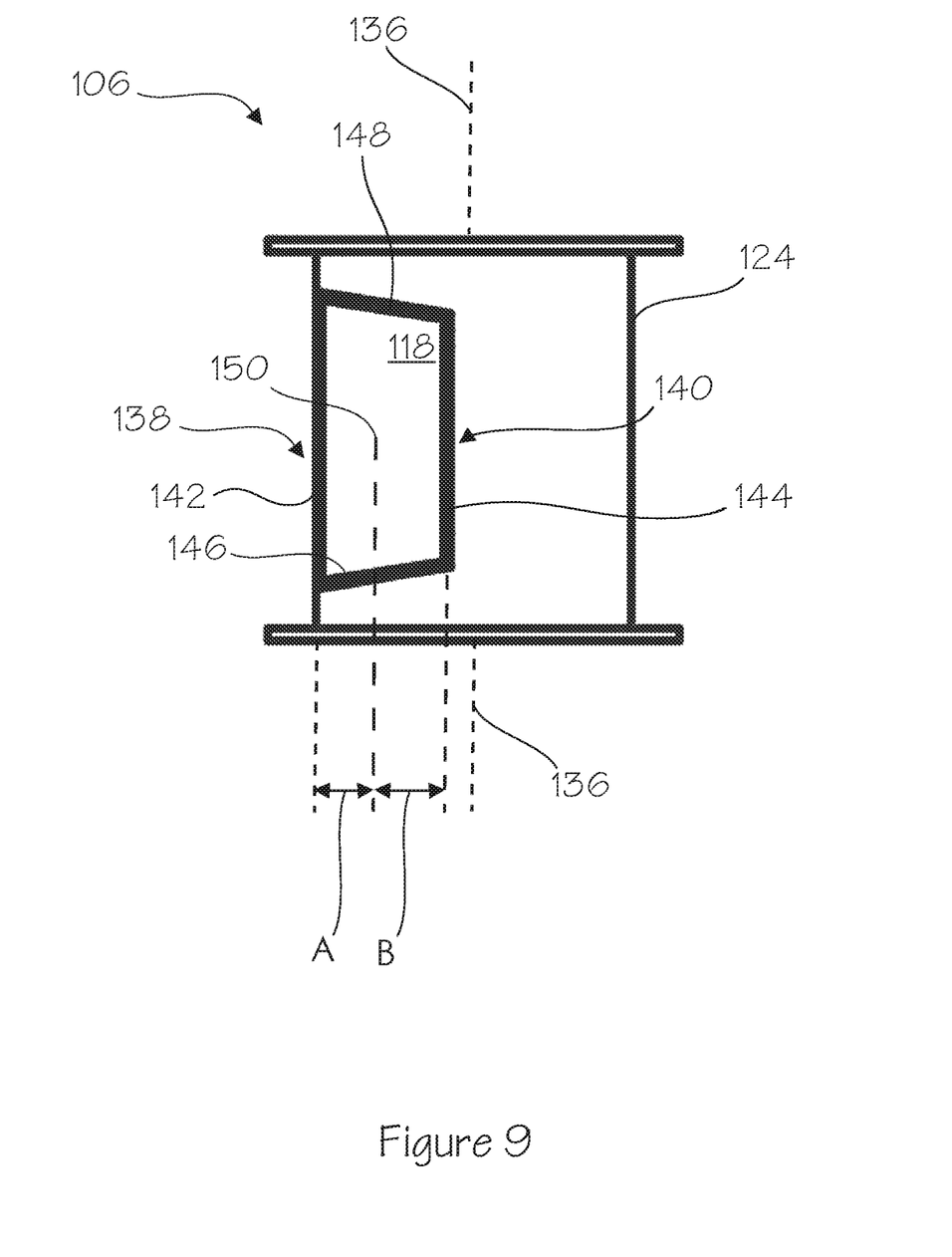
FIG. 9 is a plan view of an energy dissipater of the drainage system of FIG. 6.
Figure 10:
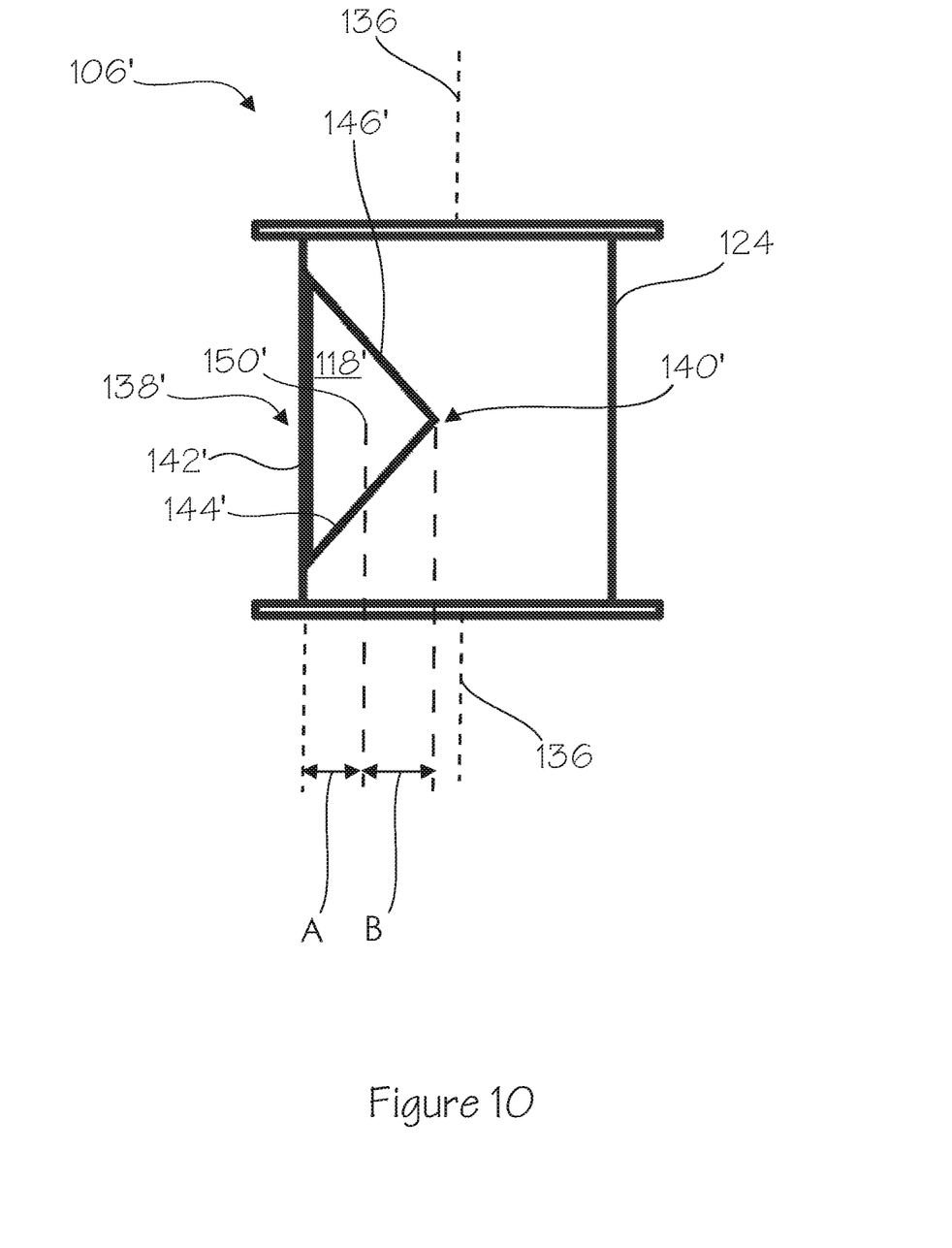
FIG. 10 is a plan view of first alternative energy dissipater.
Figure 11:
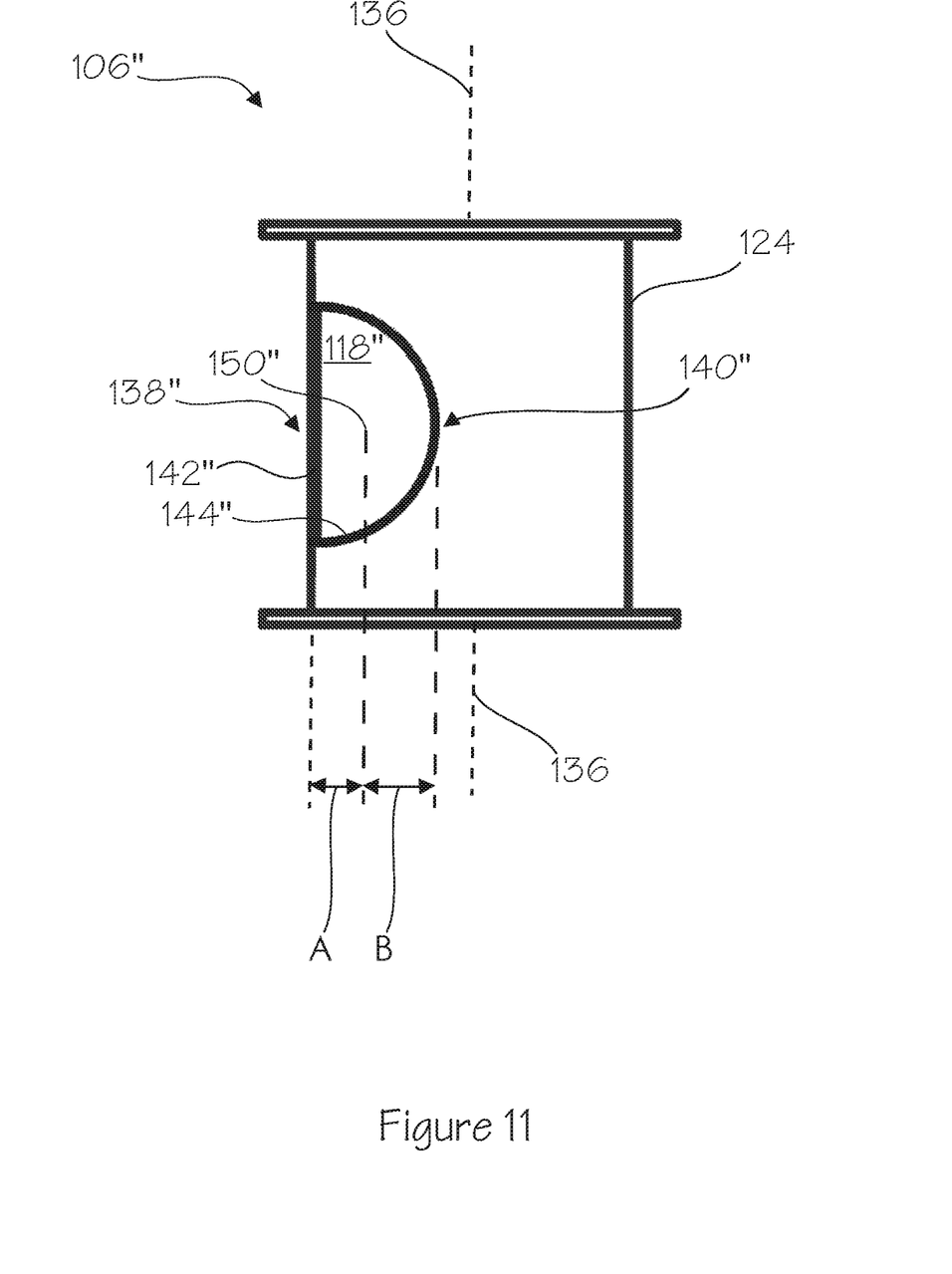
FIG. 11 is a plan view of a second alternative energy dissipater.

FIGS. 6 to 8 and 12 show part of a drainage system 100 in accordance with an embodiment of the invention. FIGS. 9 to 11 show energy dissipaters 106, 106', 106" that may be used in the drainage system 100. The drainage system 100 may form part of or be used in conjunction with a drainage system 8 as described with reference to FIGS. 1 to 5. For example, the drainage system 100 may be used in place of the lower section 30 and energy dissipater 52 described with reference to FIGS. 1 to 6. All other structural and functional aspects of a drainage system according to the invention may be the same as those described with reference to FIGS. 1 to 6.

Figure 6:
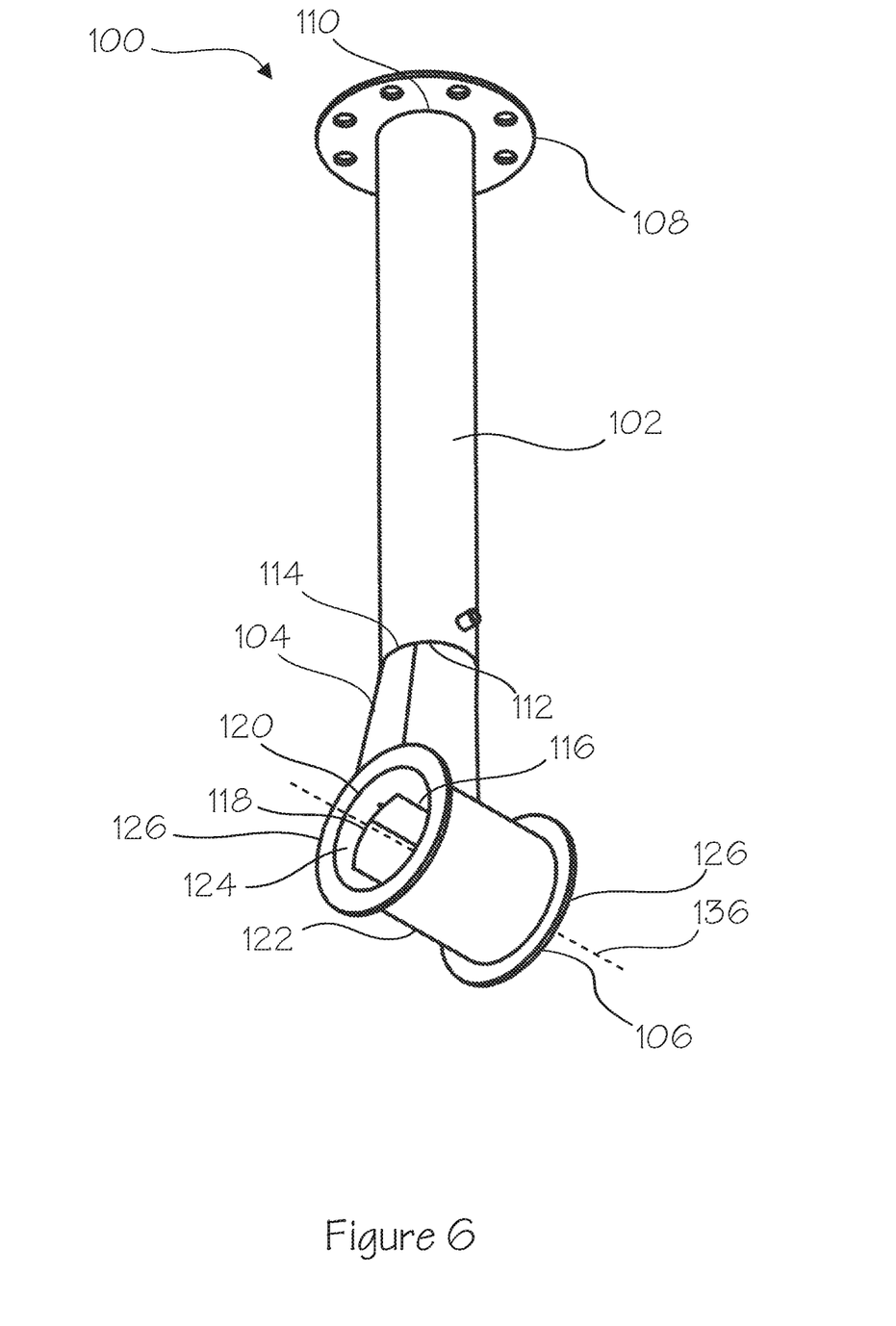
FIG. 6 is a perspective view of part of a drainage system in accordance with an embodiment of the invention.

As shown in FIG. 6, the drainage system 100 generally comprises a downpipe 102, an inlet pipe 104 and an energy dissipater 106. An upper end of the downpipe 102 comprises a flange 108 which may be attached to the tapered section 28 of the downpipe 14 of the known arrangement described with reference to FIGS. 1 to 6, for example. An inlet 110 to the downpipe 102 is located at an upper end of the downpipe 102 and an outlet 112 from the downpipe 102 is located at a lower end of the downpipe 102. An inlet 114 to the inlet pipe 104 is located at an upper end of the inlet pipe 104 and an outlet 116 from the inlet pipe 104 is located at a lower end of the inlet pipe 104. The outlet 112 of the downpipe 102 is connected to the inlet 114 of the inlet pipe 104 such that the downpipe 102 is in fluid communication with the inlet pipe 104. The profiles of the outlet 112 of the downpipe 102 and the inlet 114 of the inlet pipe 104 substantially correspond to each other. The outlet 112 of the downpipe 102 and the inlet 114 of the inlet pipe 104 are substantially circular. In alternative embodiments, the outlet 112 of the downpipe 102 and the inlet 114 of the inlet pipe 104 may be rectangular, for example.

The energy dissipater 106 comprises an open ended tube 122 which defines a substantially cylindrical dissipation chamber 124. The substantially cylindrical chamber 124 may have curved or planar wall sections, provided that the chamber 124 is capable of sustaining rotational flow within the chamber 124. The walls of the tube 122 extend around and define the axis 136 of the substantially cylindrical dissipation chamber 124. The tube 122 may be arranged such that it extends horizontally within the collection chamber 54, for example. The open ends of the tube 122 form a pair of dissipater outlets 120 from the dissipation chamber 124. Annular flanges 126 extend around the dissipater outlets 120 in order to stiffen the tube 122 and the energy dissipater 106 as a whole. In alternative arrangement the annular flanges 126 may be dispensed with. The dissipation chamber 124 comprises a dissipater inlet 118. The dissipater inlet 118 is provided in the wall of the tube 122. The inlet 118 is located approximately midway along the length of the tube 122. The profile of the dissipater inlet 118 substantially corresponds to the profile of the outlet 116 from the inlet pipe 104. The outlet 116 of the inlet pipe 104 is connected to the dissipater inlet 118 such that the inlet pipe 104 and the downpipe 102 are in fluid communication with the energy dissipater 106. The inlet pipe 104 therefore acts as a coupling between the downpipe 102 and the energy dissipater 106. The profiles of the outlet 116 of the inlet pipe 104 and the dissipater inlet 118 substantially correspond to each other. The inlet pipe 104 can either be a distinct component that is attached to the downpipe 102 and the energy dissipater 106 or be integrally formed with the downpipe 102 and/or the energy dissipater 106. Accordingly, the inlet pipe 104 can be formed by the energy dissipater 106. In alternative arrangements, the downpipe 102 and any other components of the drainage system (e.g. the drainage system 8 as described with reference to FIGS. 1 to 5) other than the inlet pipe 104 and the energy dissipater 106 can be dispensed with.

Figure 7:
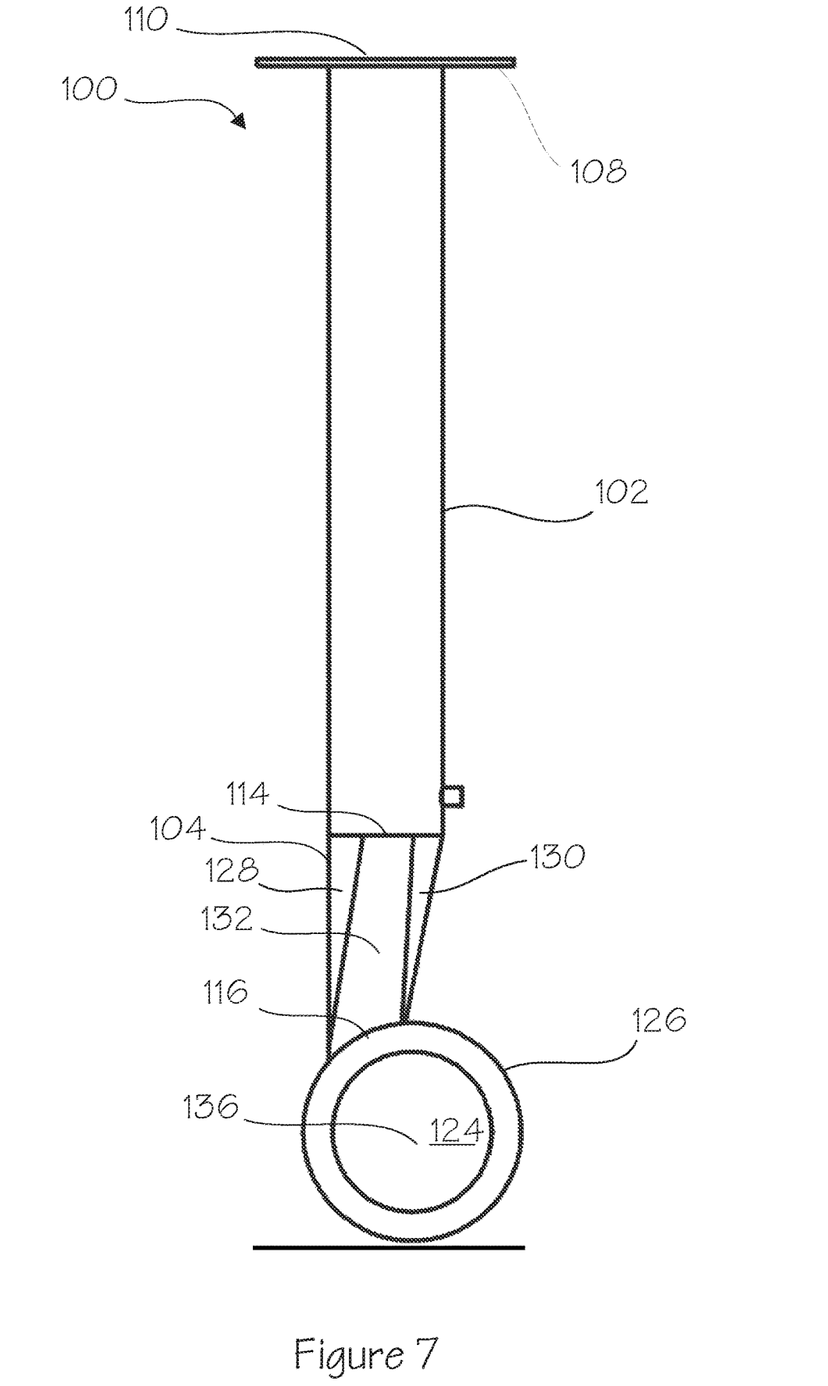
FIG. 7 is a side view of the drainage system of FIG. 6.
Figure 8:
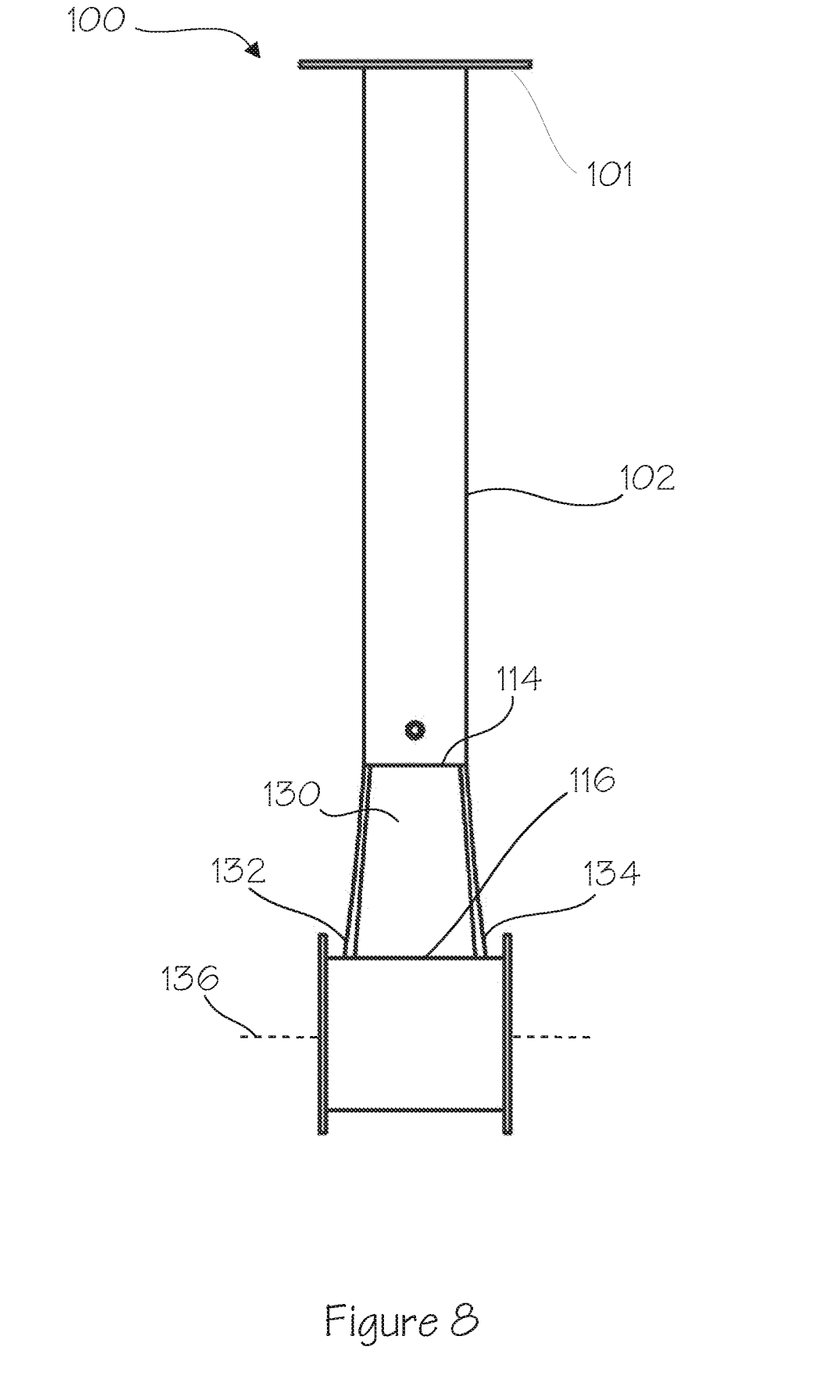
FIG. 8 is a front view of the drainage system of FIG. 6.

As shown in FIGS. 7 and 8, the inlet pipe 104 comprises a first wall 128, a second wall 130, a third wall 132 and a fourth wall 134. The first and second walls 128, 130 are offset from each other and oppose each other. The third and fourth walls 132, 134 are also offset from each other and oppose each other. The first and second walls 128, 130 are connected to each other by the third and fourth walls 132, 134. The first wall 128 extends in a tangential direction from the dissipation chamber 124 (i.e. in a tangential direction from the outer surface of the dissipation chamber 124 or tube 122). The second wall 130 extends at an angle (i.e. non-tangentially) from the outer surface of the dissipation chamber 124. The second wall 130 extends approximately radially or perpendicularly from the dissipation chamber 124 (i.e. in an approximately radial or perpendicular direction from the outer surface of the dissipation chamber 124 or tube 122).

The second wall 130 is angled towards the first wall 128 in a downstream direction. Accordingly, the inlet pipe 104 converges from the inlet 114 of the inlet pipe 104 to the outlet 116 of the inlet pipe 104 on a plane perpendicular to a longitudinal axis 136 around which the dissipation chamber 124 extends. The third wall 132 is angled away from the fourth wall 134 in a downstream direction. Accordingly, the inlet pipe 104 diverges from the inlet pipe inlet 114 to the inlet pipe outlet 116 on a plane coplanar with the axis 136. Therefore, the cross-sectional profile of the inlet pipe 104 varies from the inlet pipe inlet 114 to the inlet pipe outlet 116. However, the cross-sectional area of the inlet pipe 104 is substantially constant from the inlet 114 to the outlet 116. The inlet pipe 104 is smoothly graduated from the inlet 114 to the outlet 116 such that the fluid passing therethrough does not experience any sudden change in velocity.

FIG. 9 is a plan view of the energy dissipater 106 in isolation. The dissipater inlet 118 extends between a first end 138 and a second end 140. The first end 138 of the dissipater inlet 118 is defined by a first edge 142 and the second end 140 of the dissipater inlet 118 is defined by a second edge 144. The first and second edges 142, 144 are connected to each other by third and fourth edges 146, 148. The first and second edges 142, 144 oppose each other and the third and fourth edges 146, 148 oppose each other. The third and fourth edges 146, 148 are straight when viewed from a position along the inlet pipe 104 (i.e. when viewed from the position shown in FIG. 9). The first and second edges 142, 144 are parallel to the axis 136 and to each other. The length of the first edge 142 is greater than the length of the second edge 144. Accordingly, the dissipater inlet 118 has a substantially trapezoidal profile. The first, second, third and fourth edges 142, 144, 146, 148 are attached to the first, second, third and fourth walls 128, 130, 132, 134 of the inlet pipe 104, respectively.

As shown in FIG. 9, the width of the dissipater inlet 118 in a direction parallel to the axis 136 decreases from the first end 138 to the second end 140. The width of the dissipater inlet 118 does not at any point increase between the first end 138 and the second end 140. Accordingly, the width of the dissipater inlet 118 in a direction parallel to the axis 136 monotonically decreases from the first end 138 to the second end 140. The distance A between the centroid 150 of the dissipater inlet 118 and the first end 138 is less than the distance B between the centroid 150 of the dissipater inlet 118 and the second end 140. Accordingly, the centroid 150 of the dissipater inlet 118 is closer to the first end 138 than to the second end 140.

FIG. 10 is a plan view of a first alternative energy dissipater 106' in isolation. The first alternative energy dissipater 106' substantially corresponds to the energy dissipater 106 described with reference to FIGS. 6 to 9. However, the dissipater inlet 118' of the energy dissipater 106' has a substantially triangular profile rather than a substantially trapezoidal profile. As with the energy dissipater 106, the first alternative energy dissipater 106' extends between a first end 138' and a second end 140'. The first end 138' of the dissipater inlet 118' is defined by a first edge 142'. The first edge 142' is parallel to the axis 136. The second end 140' of the dissipater inlet 118' is defined by a second edge 144' and a third edge 146' that extend towards the first edge 142'. The second and third edges 144', 146' converge towards each other from the first end 138' to the second end 140'. The second and third edges 144', 146' are straight when viewed from a position along the inlet pipe 104 (i.e. when viewed from the position shown in FIG. 10). The first, second and third edges 142', 144', 146' are attached to respective first, second and third walls of an inlet pipe that substantially corresponds to the inlet pipe 104 except with respect to the number of its walls.

As shown in FIG. 10, the width of the dissipater inlet 118' in a direction parallel to the axis 136 decreases from the first end 138' to the second end 140'. The width of the dissipater inlet 118' does not at any point increase between the first end 138' and the second end 140'. Accordingly, the width of the dissipater inlet 118' in a direction parallel to the axis 136 monotonically decreases from the first end 138' to the second end 140'. The distance A between the centroid 150' of the dissipater inlet 118' and the first end 138' is less than the distance B between the centroid 150' of the dissipater inlet 118' and the second end 140'. Accordingly, the centroid 150' of the dissipater inlet 118' is closer to the first end 138' than to the second end 140'.

FIG. 11 is a plan view of a second alternative energy dissipater 106" in isolation. The second alternative energy dissipater 106" substantially corresponds to the energy dissipaters 106, 106' described with reference to FIGS. 6 to 10. However, the dissipater inlet 118" of the energy dissipater 106" has a substantially semi-circular profile rather than a substantially trapezoidal or triangular profile. As with the energy dissipater 106 and the first alternative energy dissipater 106", the second alternative energy dissipater 106" extends between a first end 138" and a second end 140". The first end 138" of the dissipater inlet 118" is defined by a first edge 142". The first edge 142" is parallel to the axis 136. The second end 140" of the dissipater inlet 118" is defined by a second edge 144". The second edge 144" is substantially arc-shaped. The second edge 144" converges towards a midpoint from the first end 138" to the second end 140". The first and second edges 142", 144" are attached to respective first and second walls of an inlet pipe that substantially corresponds to the inlet pipe 104 except with respect to the number of its walls.

As shown in FIG. 11, the width of the dissipater inlet 118" in a direction parallel to the axis 136 decreases from the first end 138" to the second end 140". The width of the dissipater inlet 118" does not at any point increase between the first end 138" and the second end 140". Accordingly, the width of the dissipater inlet 118" in a direction parallel to the axis 136 monotonically decreases from the first end 138" to the second end 140". The distance A between the centroid 150" of the dissipater inlet 118" and the first end 138" is less than the distance B between the centroid 150" of the dissipater inlet 118" and the second end 140". Accordingly, the centroid 150" of the dissipater inlet 118" is closer to the first end 138" than to the second end 140".

The dissipater inlets 118, 118', 118" described with reference to FIGS. 9 to 11 are offset from the axes 136 of their respective energy dissipaters 106, 106', 106". The first ends 138, 138', 138" and second ends 140, 140', 140" are disposed on a single side of the axis 136. That is, the second ends 140, 140', 140" are disposed between the first ends 138, 138', 138" and the longitudinal axes 136 when viewed from a position along the inlet pipe 104. Accordingly, the circumferential extent of each of the dissipater inlets 118, 118', 118" is less than a quarter of the circumference of their respective dissipation chambers 124 or tubes 122. However, in alternative arrangements, the first and second ends 138, 138', 138", 140, 140', 140" are disposed on opposing sides of the axis 136.

Figure 12:
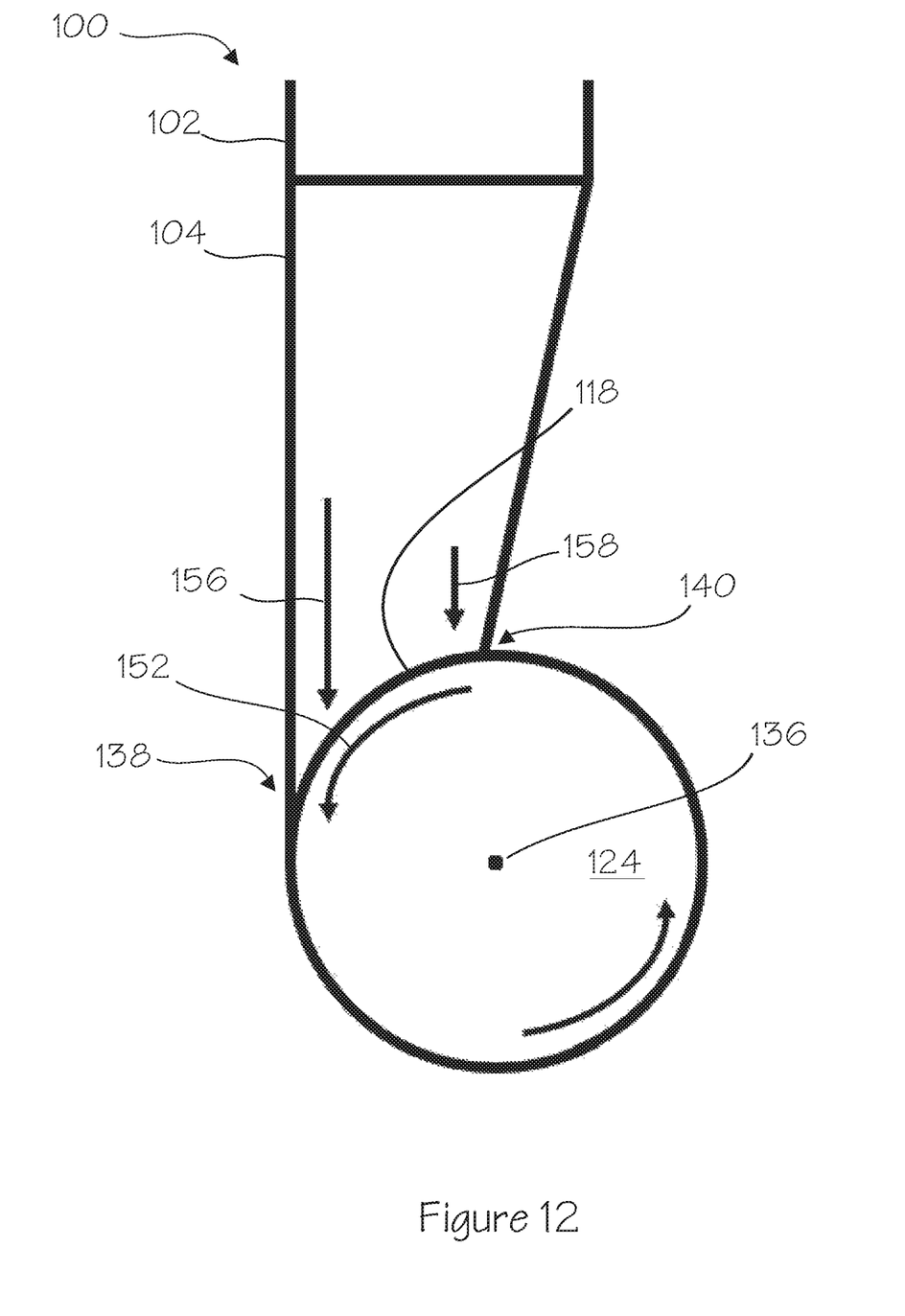
FIG. 12 is a cross-sectional schematic view of the drainage systems of FIGS. 6 to 11, in use.

FIG. 12 shows a marked-up cross-sectional schematic view of the drainage system 100. In use, fluid enters the inlet pipe 104 from the downpipe 102 before entering the dissipation chamber 124 via the dissipater inlet 118. The tangential arrangement of the inlet pipe 104 and the dissipater inlet 118 generates a circulating (i.e. rotational) flow 152 of fluid within the chamber 124. The circulating flow 152 dissipates the kinetic energy of the flow within the dissipation chamber 124 and reduces the rotational velocity of the fluid. In addition, the rotational flow 152 within the chamber 124 produces a vortex within the chamber 124. The vortex throttles flow through the dissipater inlet 118 so that the energy dissipater 106 provides a hydraulic brake which acts on fluid flowing through the downpipe 102 and the inlet pipe 104. As the fluid flows rotationally within the dissipation chamber 124 it also flows in the axial direction away from the dissipater inlet 118 towards each of the outlets 120. The circulating flow 152, and hence kinetic energy, of the fluid within the dissipation chamber 124 decreases towards the outlets 120 such that fluid exits the dissipation chamber 124 with substantially less kinetic energy than it had when exiting the inlet pipe 104.

In known arrangements such as those described with reference to FIGS. 1 to 5, the dissipater inlet is substantially circular or square in shape. Accordingly, a large proportion of fluid enters the dissipation chamber non-tangentially and at a significant angle relative to the circulating flow within the dissipation chamber. Since such flow enters the dissipation chamber relatively abruptly, it must undergo a rapid change of direction. This acceleration increases the risk of cavitation, and, thus, the risk of damage to the drainage system.

In the arrangements described with reference to FIGS. 6 to 11, the width of the dissipater inlet in a direction parallel to the axis 136 decreases from the first end to the second end. Accordingly, a relatively large proportion of the fluid passing from the inlet pipe 104 to the dissipation chamber 124 via the dissipater inlet 118, 118', 118" enters the dissipation chamber 124 in a substantially tangential direction with respect to the circulating flow 152. Such flow is indicated in FIG. 12 using arrow 156, and does not undergo rapid acceleration as it enters the dissipation chamber 124. In addition, a relatively small proportion 158 of the fluid passing from the inlet pipe 104 to the dissipation chamber 124 via the dissipater inlet 118, 118', 118" enters the dissipation chamber 124 non-tangentially and at a significant angle relative to the circulating flow 152 within the dissipation chamber. Accordingly, the minimum local pressure within the dissipation chamber 124 is increased and the area of the transition zone between the inlet pipe 104 and the dissipation chamber 124 where cavitation could potentially develop is minimized. This reduces or eliminates the occurrence of cavitation within the chamber 124. Consequently, the risk of damage to the drainage system is reduced, thereby avoiding or reducing the need to repair or replace components within the drainage system. This increases the life of the drainage system. Further, the drainage system can be designed to operate within wider safe operating flow ranges and/or be more compact.

The invention claimed is:

1. A drainage system comprising:
an inlet pipe; and
an energy dissipater comprising a tube, the tube defining a dissipation chamber, the dissipation chamber having a dissipater inlet provided in a wall of the tube, the dissipater inlet fluidically connected to the inlet pipe and a dissipater outlet arranged to discharge fluid from the dissipation chamber,
wherein the dissipater inlet extends between a first end and a second end upstream of the first end and wherein a wall of the inlet pipe extends tangentially from the dissipation chamber at the first end such that, in use, fluid is discharged into the dissipation chamber in a tangential direction, thereby inducing a circulating flow within the dissipation chamber about an axis of the dissipation chamber,
wherein the width of the dissipater inlet in a direction parallel to the axis decreases from the first end to the second end, and
wherein the width of the dissipater inlet in a direction parallel to the axis does not increase from the first end to the second end.

2. A drainage system as claimed in claim 1, wherein the dissipater inlet has a centroid that is closer to the first end than to the second end.

3. A drainage system as claimed in claim 1, wherein the first end and the second end are disposed on a single side of the axis.

4. A drainage system as claimed in claim 1, wherein the dissipation chamber is substantially cylindrical.

5. A drainage system as claimed in claim 1, wherein the first end of the dissipater inlet is formed by an edge extending parallel to the axis.

6. A drainage system as claimed in claim 1, wherein the second end of the dissipater inlet is formed by an edge extending parallel to the axis.

7. A drainage system as claimed in claim 6, wherein the first end of the dissipater inlet is formed by an edge extending parallel to the axis, and wherein the edge forming the first end is longer than the edge forming the second end.

8. A drainage system as claimed in claim 1, wherein the dissipater inlet is substantially trapezoidal.

9. A drainage system as claimed in claim 1, wherein the dissipater inlet is substantially triangular.

10. A drainage system as claimed in claim 1, wherein the dissipater inlet is substantially semi-circular.

11. A drainage system as claimed in claim 1, wherein the inlet pipe comprises an inlet for receiving fluid and an outlet for discharging fluid into the dissipation chamber.

12. A drainage system as claimed in claim 11, wherein the cross-sectional area of the inlet pipe from the inlet of the inlet pipe to the outlet of the inlet pipe is substantially constant.

13. A drainage system as claimed in claim 11, wherein the inlet of the inlet pipe is circular or rectangular.

14. A drainage system as claimed in claim 11, wherein the inlet pipe is smoothly graduated from the inlet of the inlet pipe to the outlet of the inlet pipe.

15. A drainage system as claimed in claim 1, wherein a second wall of the inlet pipe extends at an angle from the dissipation chamber at the second end of the dissipater inlet.

16. A drainage system as claimed in claim 1, wherein the tube has an open end defining the dissipater outlet.

17. A drainage system as claimed in claim 16, wherein both ends of the tube are open and each open end defines the dissipater outlet.

\* \* \* \* \*